United States Patent [19]

De Puy

[11] 3,906,336

[45] Sept. 16, 1975

[54] SEMICONDUCTOR VALVE ASSEMBLY AND BUS ARRANGEMENT FOR HIGH CURRENT LOW VOLTAGE ELECTRIC POWER CONVERTER

[75] Inventor: Robert P. De Puy, Cherry Hill, N.J.

[73] Assignee: General Electric Company, Philadelphia, Pa.

[22] Filed: July 22, 1974

[21] Appl. No.: 490,459

[52] U.S. Cl. .................... 321/8 R; 321/26; 321/27
[51] Int. Cl.² .......................................... H02M 7/00
[58] Field of Search ............ 307/150, 151; 321/8 R, 321/26, 27

[56] References Cited
UNITED STATES PATENTS

| | | | |
|---|---|---|---|
| 2,825,022 | 2/1958 | Boyer et al. ........................... | 321/26 |
| 2,999,971 | 9/1961 | Schnecke .......................... | 321/27 R |
| 3,223,901 | 12/1965 | Riley .................................... | 317/234 |
| 3,397,328 | 8/1968 | Schafft ............................ | 321/8 R X |
| 3,502,956 | 3/1970 | Fries et al. ........................... | 321/8 R |
| 3,708,740 | 1/1973 | Pierson .............................. | 321/8 R |

*Primary Examiner*—William M. Shoop
*Attorney, Agent, or Firm*—J. Wesley Haubner

[57] ABSTRACT

A triple diametric high power rectifier having relatively low unidirectional output voltage comprises power transformer apparatus having three biphase secondary windings, each in a separate enclosure with one primary phase winding and each associated with an adjacent compact assembly of two semiconductor valves and intermediate AC and DC bus structure. For each biphase transformer section a coaxial tubular bus assembly extends between secondary winding terminals on the transformer housing and two concentric circumferential arrays of semiconductor diodes each constituting one phase valve. The biphase winding terminals are connected to the valves through two tubular conductors and a third reentrant tubular conductor connects the common valve terminals to a DC terminal adjacent the transformer housing. From the DC terminal and a biphase winding neutral terminal two DC bus conductors extend in parallel spaced apart relation parallel to and on opposite sides of the coaxial conductor assembly.

11 Claims, 8 Drawing Figures

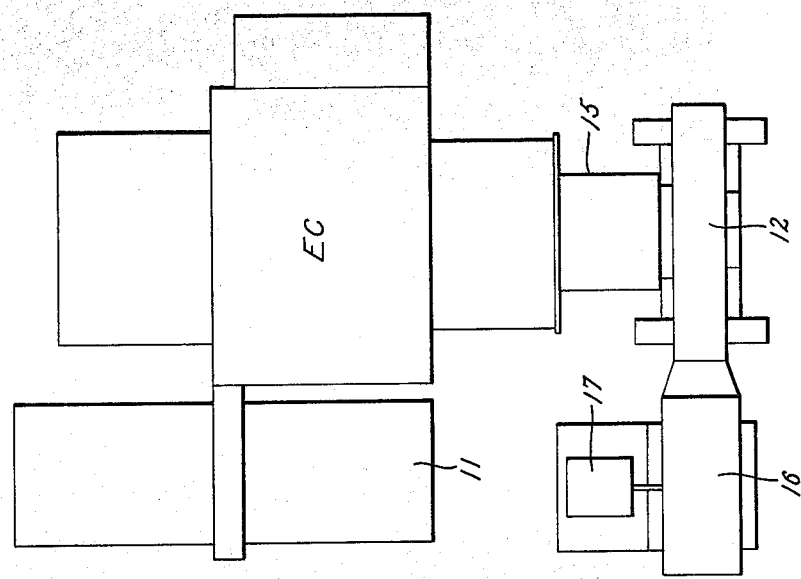
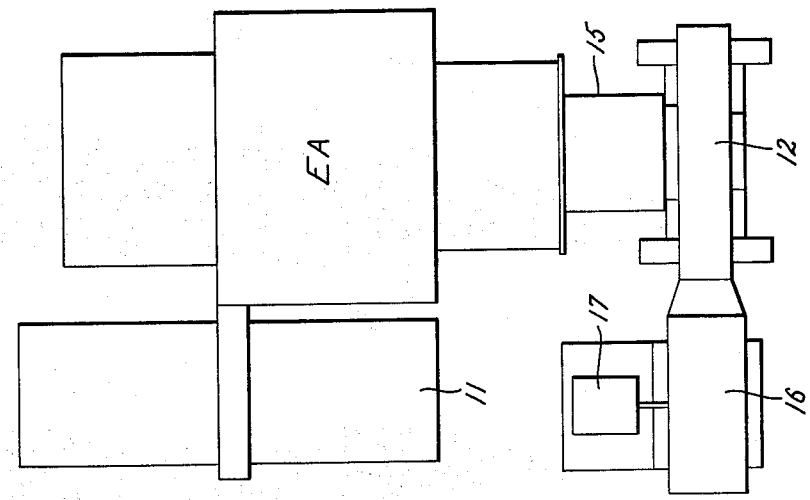
Fig. 2.
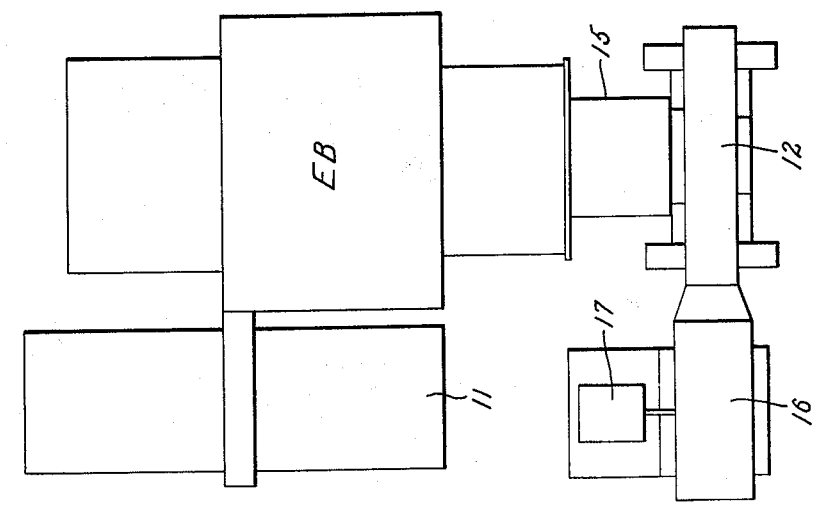

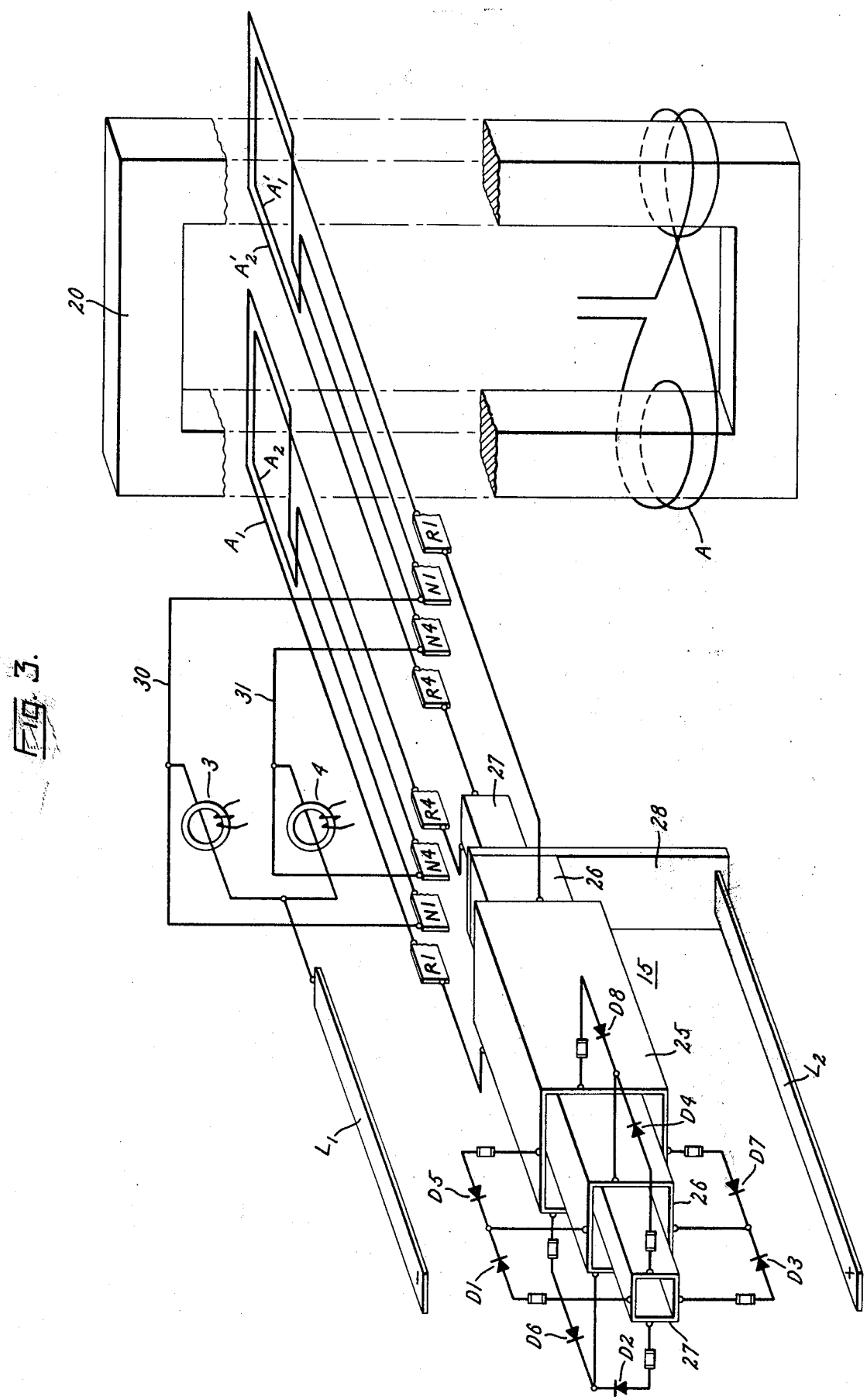

SEMICONDUCTOR VALVE ASSEMBLY AND BUS ARRANGEMENT FOR HIGH CURRENT LOW VOLTAGE ELECTRIC POWER CONVERTER

My invention relates to high current semiconductor rectifiers and inverters, and particularly to a close-coupled AC and DC bus structure and valve assembly for high current rectifiers having relatively low DC voltage output. The invention is especially applicable to power rectifiers designed to furnish direct current of the order of 50,000 amperes or more at 100 volts or less from a power transformer having its secondary windings connected in triple diametric relationship.

The following U.S. patents are representative of the most nearly relevant prior art presently known to applicant:

No. 2,825,022 — Boyer et al;
No. 2,999,971 — Schnecke;
No. 3,223,901 — Riley.

When solid state semiconductor devices, such as semiconductor diodes, are used to conduct power current in high current rectifiers or inverters it is usually necessary to connect a number of diodes in parallel circuit relation to constitute each valve connected to one phase terminal of the power transformer. Such semiconductor devices are easily damaged by excess current or overvoltage and it is therefore desirable to provide regulating means for balancing current through a plurality of parallel-connected diodes constituting a single valve.

In high power rectifiers for supplying direct current at many thousands of amperes to industrial process equipment it is usual to utilize a six phase power transformer in order to minimize ripple current in the DC output. In the past nearly all such industrial rectifiers have used a double-wye connection with an interphase transformer between the secondary winding neutrals. As shown in the Boyer patent above, it is also known to utilize a triple biphase, or triple diametric, transformer connection with interphase transformers or other midpoint reactors in the neutral leads between the three secondary winding midpoints and one DC bus. such triple diametric connections have been used infrequently however, because the interphase transformer, or alternatively iron core midpoint reactors, are of such size and cost that use is uneconomical. Such a triple diametric connection is, however, attractive from the viewpoint that it permits 180° conduction of each valve and thus uses the diodes more efficiently.

In any multiphase rectifier, of course, some ripple current, or AC component, does exist. It is therefore desirable for efficient operation to minimize inductance in the AC leads and to maximize inductance in the DC leads, but also to minimize the length of both AC and DC bus conductors.

Accordingly, it is a general object of my invention to reduce space requirements, cost and operating losses and to improve the efficiency of high current electric power converters.

It is another and more specific object of my invention to provide improved means for eliminating interphase transformers or other midpoint reactors in multiphase converter transformers having secondary windings connected to provide a plural number of phase neutrals, or midpoints.

It is one principal object of my invention to provide an improved current balancing assembly of parallel connected diodes constituting one or more valves in a multiphase power converter.

Another important object of my invention is to provide a combined current balancing multi-diode valve assembly and cooperating inductive DC bus arrangement.

It is a more particular object of my invention to provide an improved high current bus and valve assembly for a triple diametric power rectifier providing both current balance for multi-diode phase valves and DC bus inductance sufficient to obviate need for interphase transformers for other magnetic core midpoint reactors.

In multi-phase rectifiers of the type providing a plurality of phase neutral points (i.e., midpoints) connected through reactors, the magnitude of ripple current in the DC output, i.e., the magnitude of the AC component of output current, is a function of the inductance of the midpoint reactors. For any predetermined output ripple current there is a direct linear relation between inductance and DC voltage, so that less inductance is required at low DC voltage. For any predetermined DC voltage however, there is an inverse linear relation between inductance and ripple current, so that less inductance is required at high DC current. Thus in a rectifier designed for high current at low voltage the required inductance has been found to be sufficiently small that it may be provided by appropriate DC bus geometry. By thus eliminating need for interphase transformers or iron core midpoint reactors it is feasible to use a triple diametric transformer connection.

In accordance with my invention I so combine the structure of an improved current balancing diode valve assembly and a reactive DC bus assembly that I minimize length of both AC and DC conductors and the inductance of the AC conductors. By cooperative positioning of the DC conductors I maximize their inductance and eliminate the need for certain iron core magnetic components usually associated with a triple diametric transformer connection. Such a transformer connection utilizes the power diodes more efficiently, and by combining with it my improved diode valve and DC bus assembly I attain improved rectifier efficiency and minimize space requirements and cost of both of the transformer and the high current conductor assembly.

In carrying out my invention in one preferred embodiment I connect a multiple diode rectifier valve to each secondary winding terminal of a power transformer circuit having low voltage secondary windings connected in triple diametric relation. Separate enclosures are provided for each biphase secondary winding and its associated primary phase winding, and a double valve diode and bus assembly is associated with each biphase transformer enclosure.

In my double valve and bus assembly for each biphase transformer section each valve comprises an array of parallel connected-diodes mounted in a generally ring or circumferential configuration on a conductive base plate with like electrodes of all diodes connected to the plate to constitute one terminal of the valve. In a preferred embodiment the two valves are mounted on separate base plates disposed in parallel spaced relation to form opposite sides of a hollow enclosure into which cooling air is pumped. The two plates are connected electrically to constitute a common terminal for the two valves.

To effect close coupling of the transformer and the rectifier, and to minimize inductance of the alternating current phase conductors therebetween, the phase conductors connected between each double valve assembly and biphase transformer winding are tubular and assembled in coaxial relation with each other and with a DC valve terminal bus, the tubular axis being perpendicular to the valve base plates and the diodes of each valve being in concentric array about that axis. At the valve end the intermediate tubular DC conductor is connected through the diode mounting plates, i.e., the common valve terminal, and the inner and outer tubular conductors are each connected to the other terminal of one diode valve array. At the axially opposite transformer end the inner and outer tubular conductors are connected, respectively, to opposite phase terminals of one biphase transformer winding and the central tubular conductor is connected to one DC sectional terminal associated with that transformer section.

In the foregoing coaxial conductor structure the DC bus connected to the common terminal of each biphase pair of valves passes directly and reentrantly back through the coaxial conductor assembly and is connected to one sectional DC bus positioned parallel to the tubular conductor axis at one side of the coaxial bus assembly. The neutral, or midpoint, of the biphase transformer winding is connected directly to a second sectional DC bus disposed in parallel spaced relation with the tubular conductor axis at the opposite side of the coaxial bus assembly. The two DC buses associated with each biphase transformer section are thus in parallel spaced apart relation with the double valve and coaxial conductor assembly therebetween.

My invention will be more fully understood and its several objects and advantages further appreciated by referring now to the following detailed specification taken in conjunction with the accompanying drawing in which:

FIG. 2 is a diagrammatic plan view of a three phase transformer and rectifier assembly embodying my invention and adapted for connection in accordance with the circuit of FIG. 1, the three similar sections, each being associated with one of three primary phase windings.

FIG. 3 is a partially schematic perspective view of a biphase transformer section and its associated coaxial bus assembly and a biphase valve array for one phase section of the triple diametric rectifier apparatus of FIGS. 1 and 2;

Figure 1:
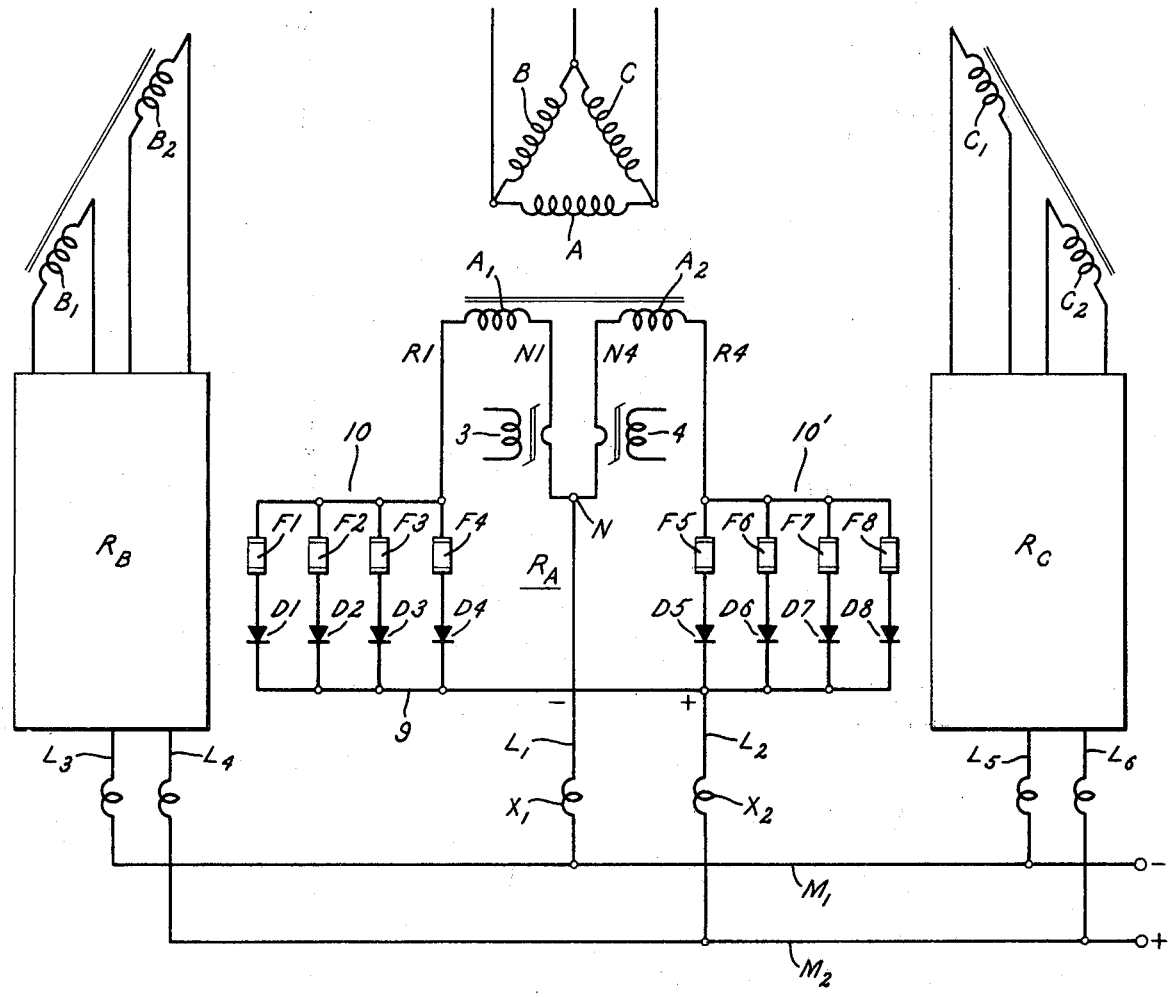
FIG. 1 is a schematic circuit diagram of a triple diametric rectifier-transformer combination.

Referring now to the drawing, I have shown at FIG. 1 a triple diametric rectifier circuit comprising a power transformer having delta connected three phase primary windings A, B, C and three biphase secondary windings $A_1$, $A_2$; $B_1$, $B_2$; $C_1$, $C_2$, associated respectively with the primary phase windings. Each secondary winding comprises a pair of low voltage windings, as $A_1$, $A_2$, in biphase relation providing a neutral or midpoint connection. At FIG. 1 the secondary windings $A_1$, $A_2$ are shown connected to a full wave rectifier circuit $R_A$ associated with primary phase A and having sectional direct current (DC) bus $L_1$, $L_2$ connected to main DC load bus conductors $M_1$, $M_2$ respectively. For simplification of description similar full wave rectifier circuits associated with primary winding phases B and C have been illustrated in block form at $R_B$ and $R_C$ and shown connected to the main DC bus through sectional DC bus conductors $L_3$, $L_4$ and $L_5$, $L_6$ respectively.

As illustrated at FIG. 1 the full wave biphase rectifier section associated with primary phase A comprises a pair of low voltage secondary windings $A_1$, $A_2$ inductively coupled with the primary winding A and connected in series circuit relation at a midpoint or neutral terminal N. As indicated in the drawing the biphase windings $A_1$ and $A_2$ are provided with neutral terminals N1 and N4, respectively, which are connected to the midtap or phase neutral N through a pair of saturable core reactors 3 and 4, respectively, for controlling the DC output voltage on the main load bus $M_1$, $M_2$. The opposite polarity biphase terminals of the secondary windings $A_1$ and $A_2$ are designated R1 and R4, respectively.

In the rectifying circuit associated with phase A at FIG. 1 the secondary winding phase terminal R1 is connected to one terminal conductor 10 of a unidirectional valve comprising a plurality of diode semiconductors D1, D2, D3, D4 having their anode-to-cathode circuits connected in parallel circuit relation, each in series with a suitable fuse F1, F2, F3, F4. Similarly, the secondary winding phase terminal R4 is connected to the like terminal conductor 10' of a second valve comprising a plurality of semiconductor diodes D5, D6, D7 and D8 connected in parallel circuit relation and in series respectively with fuses F5, F6, F7, F8. The opposite terminals of both multi-diode valves are connected to a common valve terminal conductor 9. The biphase rectifier section associated with primary winding phase A is completed by connecting the winding neutral N to the main negative DC bus $M_1$ through a negative sectional DC bus $L_1$ and a reactive impedance element $X_1$ and by connecting the positive valve terminal 9 to the main positive DC bus $M_2$ through the positive sectional DC bus $L_2$ and a reactive impedance $X_2$. Similar reactive impedances are connected in the sectional DC buses $L_3$, $L_4$ associated with phase B and $L_5$, $L_6$ associated with phase C.

It will be understood that in the rectifier circuit briefly described above and illustrated schematically at FIG. 1, the parallel connected semiconductor diodes associated with any one phase terminal of a secondary winding, as the diodes D1, D2, D3, D4, represent any desired number of diodes connected in parallel circuit relation to conduct the desired magnitude of phase current. As disclosed in the Riley patent referred to above, it is known to be desirable that current be equally distributed among the parallel-connected diodes which constitute the rectifying valve for each secondary winding phase terminal. The Riley patent shows that such balancing may be accomplished by connecting the phase terminals of the transformer to the associated valve terminals through coaxial tubular conductors and mounting the diodes which constitute each valve in a generally concentric array circumferentially around the coaxial conductors. In my improved diode assembly and bus structure for a low voltage high current power rectifier I utilize such a coaxial tubular bus connection and circumferential diode mounting in conjunction with appropriate electrical and spacially positioning of the sectional DC lines and terminal conductor 9 that the line impedances $X_1$, $X_2$ are built inherently into the combined bus and mounting structure and the space requirements for the whole are minimized.

At FIG. 2 I have illustrated diagrammatically the physical arrangement of a three phase rectifier of the type having a circuit arrangement as at FIG. 1 and including in each biphase section an improved valve and bus structure to be more fully described hereinafter. At FIG. 2 the three enclosures EA, EB and EC each contains a transformer core for one phase of the primary windings A, B, C and one pair of biphase secondary windings such as the windings $A_1$, $A_2$ of FIG. 1. Each transformer section EA, EB, EC has associated a cooler 11, a diode mounting enclosure 12, and a coaxial bus assembly 15 between the transformer output terminals and the associated diode valve. Each diode mounting enclosure 12 is provided with a cooling system comprising a blower 16 and a blower motor 17.

At FIG. 3 I have illustrated diagrammatically and partially schematically the physical disposition of the secondary transformer windings $A_1$, $A_2$ (FIG. 1) and their terminals R1, N1, R4, N4 and the connection of those terminals to a coaxial bus and diode assembly and to a pair of parallel spaced apart DC bus conductors. In FIG. 3 a two-legged rectangular iron core 20 in one of the phase enclosures is provided with a high voltage primary phase winding, such as winding A, and with two pairs of low voltage high current single turn secondary windings $A_1$, $A_1'$, and $A_2$, $A_2'$. Secondary winding pairs $A_1$, $A_1'$ and $A_2$, $A_2'$ correspond, respectively, to windings $A_1$ and $A_2$ at FIG. 1. The secondary windings at FIG. 3 are brought out to a double set of secondary terminals R1, N1, N4, R4 with both sets disposed in linear alignment and in reverse terminal sequence as between the sets. As will be apparent from other figures of the drawing to be described hereinafter, the two sets of four secondary winding terminals protrude from the transformer section enclosure, as from the enclosure EA, and are connected to a tubular concentric conductor and double diode valve assembly 15. For simplicity diodes constituting the valves associated with phase terminals R1 and R4 are illustrated diagrammatically at FIG. 3.

The coaxial bus assembly illustrated at FIG. 3 comprises three tubular rectangular bus conductors 25, 26, 27 nested in coaxial relation with two concentric circumferential arrays of diode valves connected between the tubular conductors at their ends remote from the winding terminals R1, N1, R4, N4. At that end of the coaxial bus assembly adjacent the winding terminals the inner tubular conductor 27 is connected to both R4 winding terminals and the outer tubular conductor 25 is connected to both R1 winding terminals. At the same end the intermediate or central tubular conductor 26 is connected by means of a terminal strap 28 to a predetermined length of sectional DC line $L_2$ disposed beneath the coaxial bus assembly and in parallel spaced relation with the common tubular axis. A negative sectional DC line $L_1$ of substantially the same length is positioned in parallel spaced coplanar relation with the line $L_2$ and above the coaxial bus assembly. The negative DC line $L_1$ is connected through saturable core reactors 3 and 4 mounted on the transformer section casing and to conductors 30 and 31, respectively, the conductor 30 connecting to both N1 transformer terminals and the conductor 31 connecting to both N4 transformer terminals.

At that end of the coaxial bus assembly 25, 26, 27 which is remote from the transformer terminals an array of diodes D1, D2, D3 and D4 constituting a rectifying valve for the phase terminal R4 are connected in parallel circuit relation between the inner tubular conductor 27 and the central tubular conductor 26. The diodes D1–D4 are disposed circumferentially and concentrically about the tubular bus axis in a balanced ring formation. Similarly an array of diodes D5, D6, D7 and D8 is arranged in a like ring formation and is connected in parallel circuit relation between the outer tubular bus 25 and the central tubular bus 26. Thus at that end of the tubular bus assembly remote from the transformer terminals the outer tubular bus 25 from phase terminals R1 is connected through an array of diodes constituting one phase valve to the proximate end of the intermediate tubular bus 26. Similarly the inner tubular bus 27 from phase terminals R4 is connected to the same central tubular bus through a second diode array constituting a second phase valve.

The common tubular DC bus 26 is the physical counterpart of the common valve terminal conductor 9 shown schematically at FIG. 1. As will be observed from FIG. 3, however, the common tubular DC conductor 26 passes reentrantly back through the coaxial bus assembly from the output terminals of the several valve arrays to the DC terminal strap 28 at the other end of the DC conductor 26. This reentrant connection, conducting direct current through the tubular bus 26 within the coaxial assembly maintains a balanced disposition of current in the circumferential arrays of valve diodes.

Immediate connection of the positive DC section bus $L_2$ to the strap 28 in parallel spaced relation with the coaxial bus assembly provides for corresponding positioning on the other side of the coaxial assembly of the negative DC bus $L_1$ which is connected through the saturable core reactors 3 and 4 to the negative terminals N1, N4. The spacing between the DC section buses $L_1$ and $L_2$ is such, and their lengths are such, that their self inductance is sufficient to provide an adequate magnitude of smoothing reactance $X_1$, $X_2$ (FIG. 1) in the DC lines. For example, in a practical embodiment of this invention providing direct output current from three such biphase transformer sections, total output current is rated above 100,000 amperes at less than 50 volts DC. For a rectifier transformer of such rating the DC section buses $L_1$, $L_2$ are approximately 8 ft. long and spaced apart by about 7 ft. This provides a compact interconnection between each transformer section and the main DC bus and permits positioning of the coaxial conductor assembly between the DC buses $L_1$, $L_2$, as indicated schematically at FIG. 3.

Figure 4:
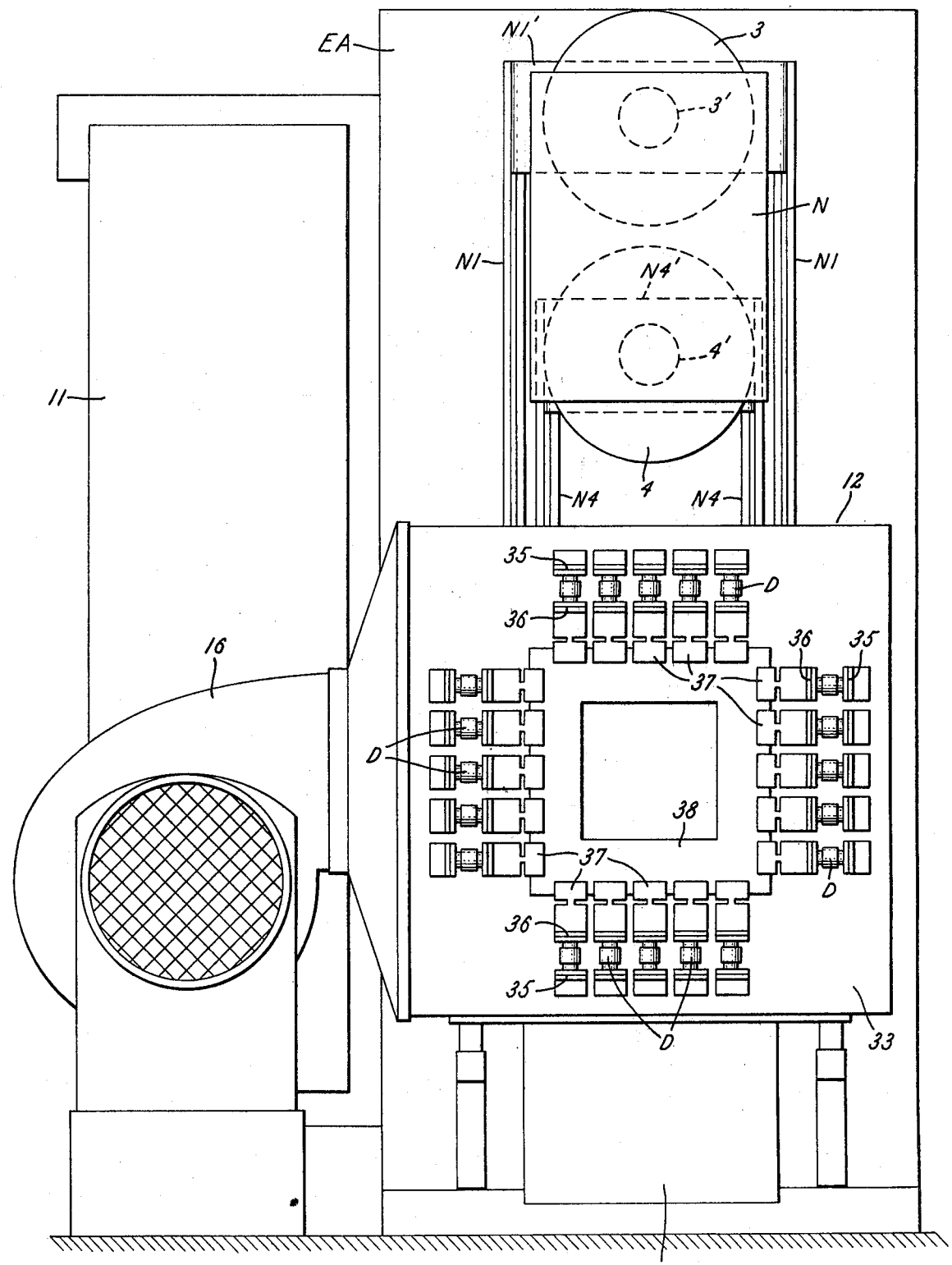
FIGS. 4, 5 and 6 are end, side and plan views, respectively of the one of the three transformer-rectifier sections illustrated schematically at FIG. 2.
Figure 5:
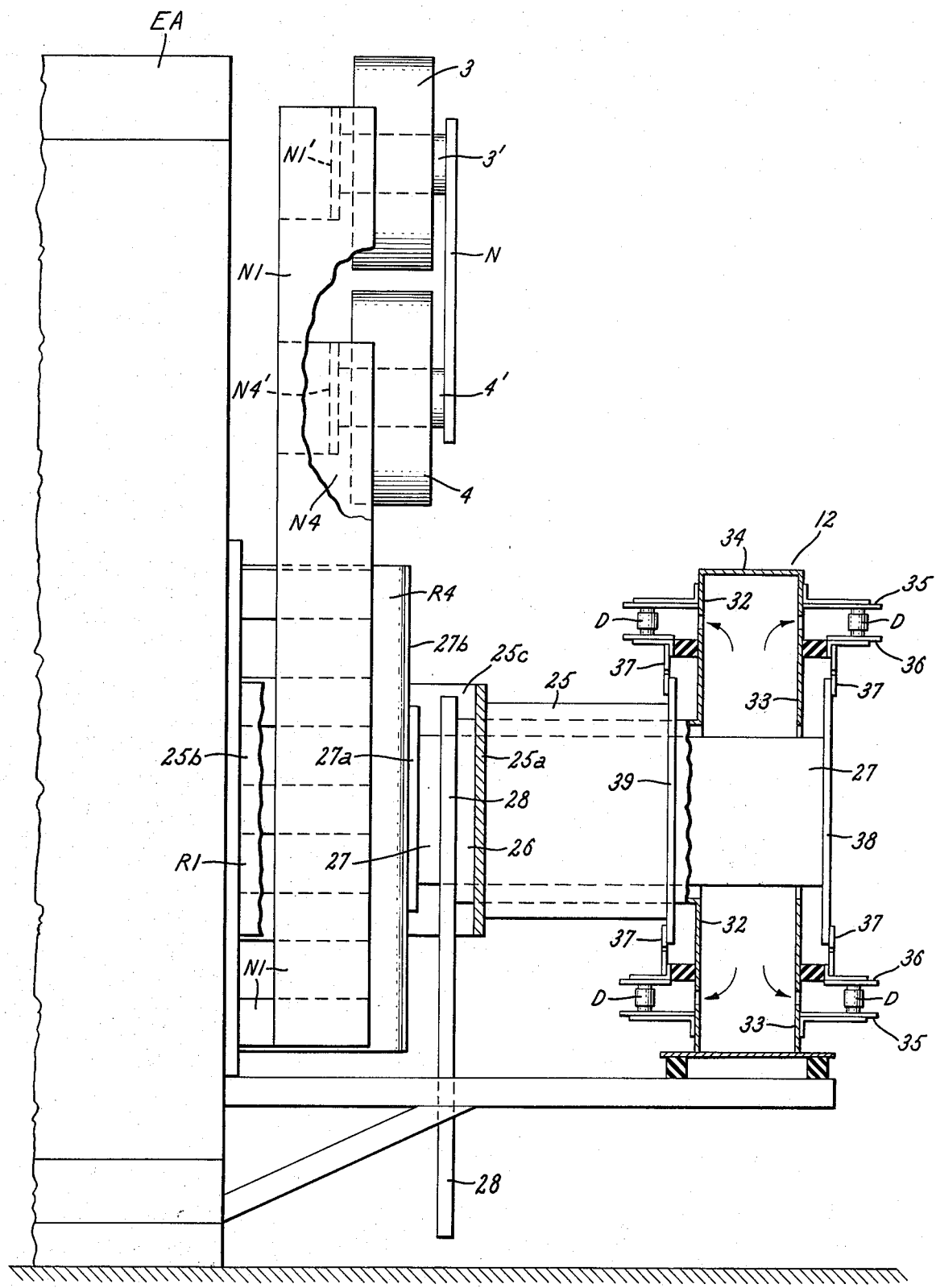
Figure 6:
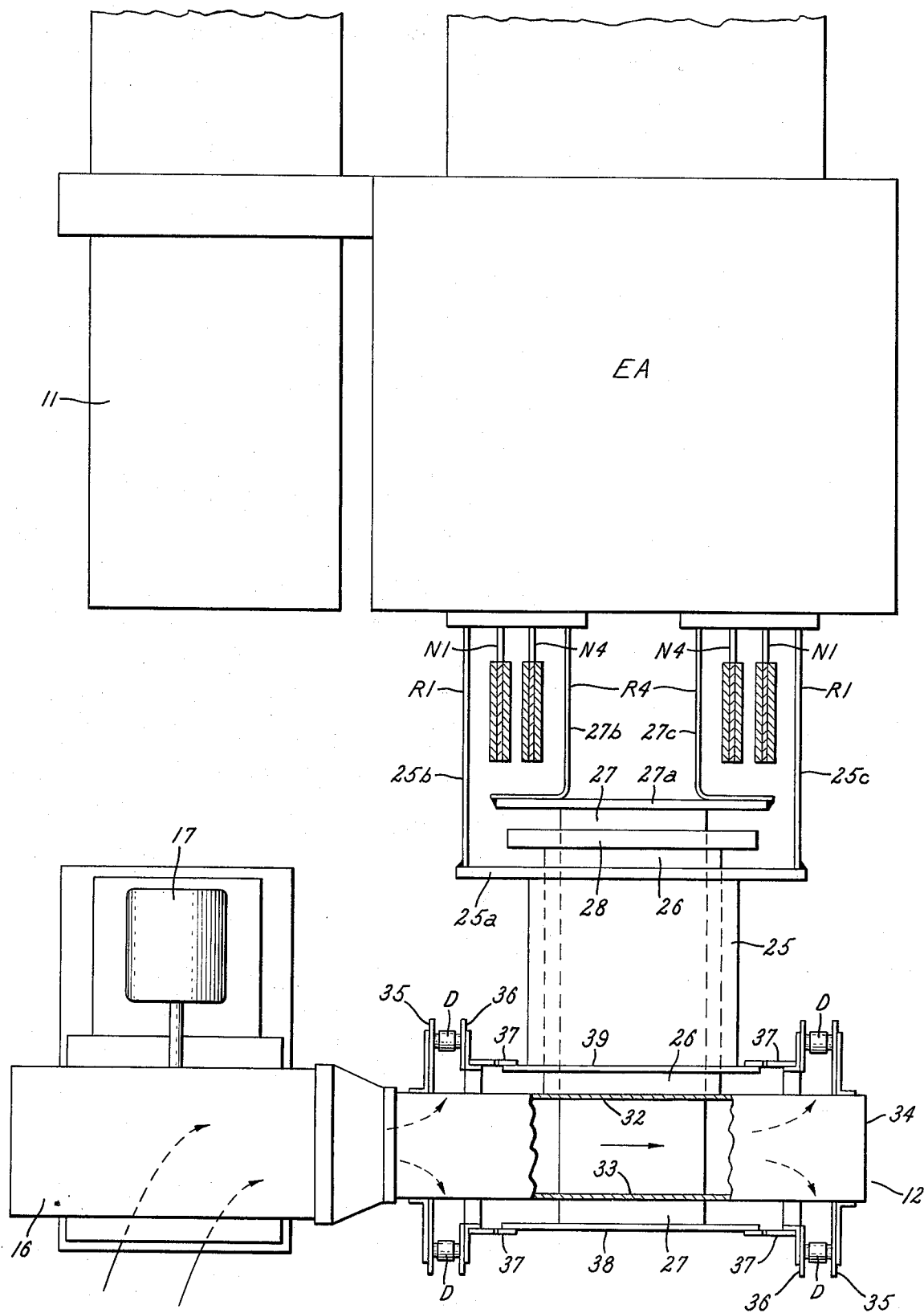

At FIGS. 4, 5, and 6 I have shown end, side and plan views, respectively, of a balanced coaxial valve and bus assembly associated with one phase section of the three phase to triple biphase transformer rectifier shown in outline at FIG. 2. Referring particularly to FIGS. 5 and 6 it will be observed that the transformer tank enclosure EA has protruding from one side thereof two sets of secondary winding terminals R1, N1, R4, N4 as described above in conjunction with FIG. 3. The coaxial tubular conductors 25, 26, 27 are connected at one end to the phase terminals R1 and R4 and to the positive DC terminal strap 28, as described above. In FIGS. 5 and 6 it is illustrated that the inner tubular conductor 27 extends axially beyond the tubular conductors 25 and 26 at the transformer end and is connected through a transverse conducting strap 27a to the phase terminals R4. The intermediate tubular conductor 26 terminates at the transformer end somewhat short of the end of the conductor 27 and is connected to the transverse DC terminal strap 28, the strap 28 being apertured to permit passage of the tubular conductor 27 therethrough. The outer tubular conductor 25 terminates at the transformer end somewhat short of the conductor 27 and is connected through a transverse strap 25a to the phase terminals R1, the strap 25a being centrally apertured to permit passage of the tubular conductor 26 therethrough.

From FIGS. 5 and 6 it will be observed that each terminal R4 illustrated at FIG. 3 actually consists of an aligned vertical array of five R4 terminals connected together and to the transverse conducting bar 27a by angular vertical conductors 27b and 27c. For high current carrying capacity each of the eight secondary coil terminals shown schematically at FIG. 2 consists of such a vertical array of five terminals which constitute the terminal ends of five similar sets of single turn secondary coils on each leg of the transformer core 20 FIG. 3). Similarly, the outermost arrays of R1 terminals are connected through vertical conducting bars 25b and 25c to the transverse conducting strap 25a.

At the opposite end of the coaxial tubular conductor assembly 25, 26, 27, i.e., at the end remote from the transformer terminals, the intermediate tubular conductor 26 is connected, as best shown at FIG. 6 to a pair of axially spaced apart conductive base plates 32, 33 through both of which the inner tubular conductor 27 passes. The base plates 32, 33 are connected together around their periphery by a conductive circumferential wall 34 to form a rectangular box-like enclosure to which cooling air is supplied (FIG. 6) by the blower 16. Upon the outer surface of each base plate 32, 33, and concentrically with the tubular bus, there is mounted a circumferential array of semiconductor diodes connected in parallel circuit relation to constitute one phase valve of the biphase rectifier section. Referring particularly to FIG. 4, one such diode array mounted upon the base plate 33 (FIGS. 5 and 6) comprises five juxtaposed pairs of conductive supporting fingers on each side of a rectangular circumferential pattern surrounding the axis of the coaxial tubular conductor assembly. As best shown at FIGS. 4 and 5, each pair of diode supporting fingers, designated as 35, 36, is in spaced apart relation with a diode D positioned therebetween. The fingers extend outwardly from the base plates 32, 33 in opposite directions parallel to the tubular axis. The radially outer fingers 35 are mounted upon and electrically connected to the conductive base plate 32 or 33, as the case may be. Those radially inner fingers 36 carried by the base plate 33 are insulated from the plate 33 and electrically connected, each through a suitable fuse 37, to a conductive flange 38 on the tubular conductor 27, so that the circumferential diode array on the base plate 33 constitutes a single valve connected between the inner tubular conductor 27 (phase terminal R4) and the intermediate DC conductor 26. In like manner, the radially outer fingers 35 on the base plate 32 are electrically connected to the base plate 32; the inner fingers 36 carried on plate 32 are insulated from the plate 32 and electrically connected, through individual fuses 37, to a flange 39 on the outer tubular conductor 25 (phase terminal R1).

Referring now to FIG. 1 the DC bus $L_1$ is connected at one end through the amplistats 3 and 4 to the neutral terminals N1 and N4 of the transformer secondary winding. In the structure illustrated at FIGS. 4, 5 and 6 each of the N1 terminals and each of the N4 terminals comprises a vertical array of terminal conductors extending from the transformer enclosure EA (similar to the vertical array of R4 terminals shown at FIG. 5). Each vertical array of neutral terminals is interconnected by a vertical bus bar extending upwardly to a pair of saturable core reactors 3, 4 located above the winding terminal arrays. At FIG. 4 these vertical neutral bus bars are designated as an outer pair of N1 bars and an inner pair of N4 bars, the N1 bars extending vertically beyond the N4 bars. Behind the reactor 3 the N1 bars are interconnected by a transverse plate N1' and behind the amplistat 4 the N4 bars are interconnected by a transverse conducting plate N4'. From these transverse neutral plates tubular conductors 3' and 4' extend through the reactors 3, and 4, respectively, and are interconnected by a transverse conductive plate N to constitute the neutral terminal shown at FIG. 1. From the neutral terminal N the sectional DC bus $L_1$ comprises a length of bus conductor parallel to the axis of the coaxial conductor assembly and in parallel spaced apart relation with the sectional DC bus $L_2$.

As indicated at FIGS. 2, 4 and 6 cooling air is supplied from a blower 16 to the interior of the box-like enclosure formed by the conductive valve base plates 32, 33. Pressurized air contained in this enclosure escapes axially between the coaxial conductors 25, 26 and 27 to cool those conductors, and escapes also in the region of each pair of diode supporting fingers 35, 36 to cool these heat conducting fingers and thus the diode mounted between them.

It will now be evident to those skilled in the art that in operation my improved coaxial bus assembly and associated circumferential multiple valve diode assembly effects by magnetic action a balancing of current through the parallel connected diodes of each valve and also minimizes inductance of the coaxial AC buses. The current balancing action is obtained by connecting the AC phase terminals of the associated transformer secondary winding to two of the tubular conductors at their ends remote from the valve assembly and connecting the common tubular DC bus directly to both valve mounting plates for reentrant passage through the concentric assembly to the remote terminal end where it provides one DC terminal. This reentrant passage of the tubular collector bus permits location of two section DC buses ($L_1$ and $L_2$) parallel to the tubular axis and in spaced apart relation with the coaxial bus assembly located therebetween. By such location each of the DC buses possesses appreciable inherent inductance and each serves as an interphase reactor between the associated phase section of the three phase transformer and the two main DC buses to which the three pairs of sectional DC buses are connected in parallel circuit relation. By this compact assembly of AC and DC buswork I am able to obtain balancing of the parallel diode currents in each phase valve, low AC bus reactance and sufficient interphase DC bus reactance to minimize AC ripple in the DC output current.

It will now be evident to those skilled in the art that, while I have described my invention as applied to a six phase rectifier connected in triple diametric mode to a three phase source of alternating current power, the invention is equally applicable to similarly connected inverters utilizing phase controllable thyristor valves. The invention is applicable also to inverters and rectifiers supplied by transformers having their secondary windings connected in double wye configuration.

Figure 8:
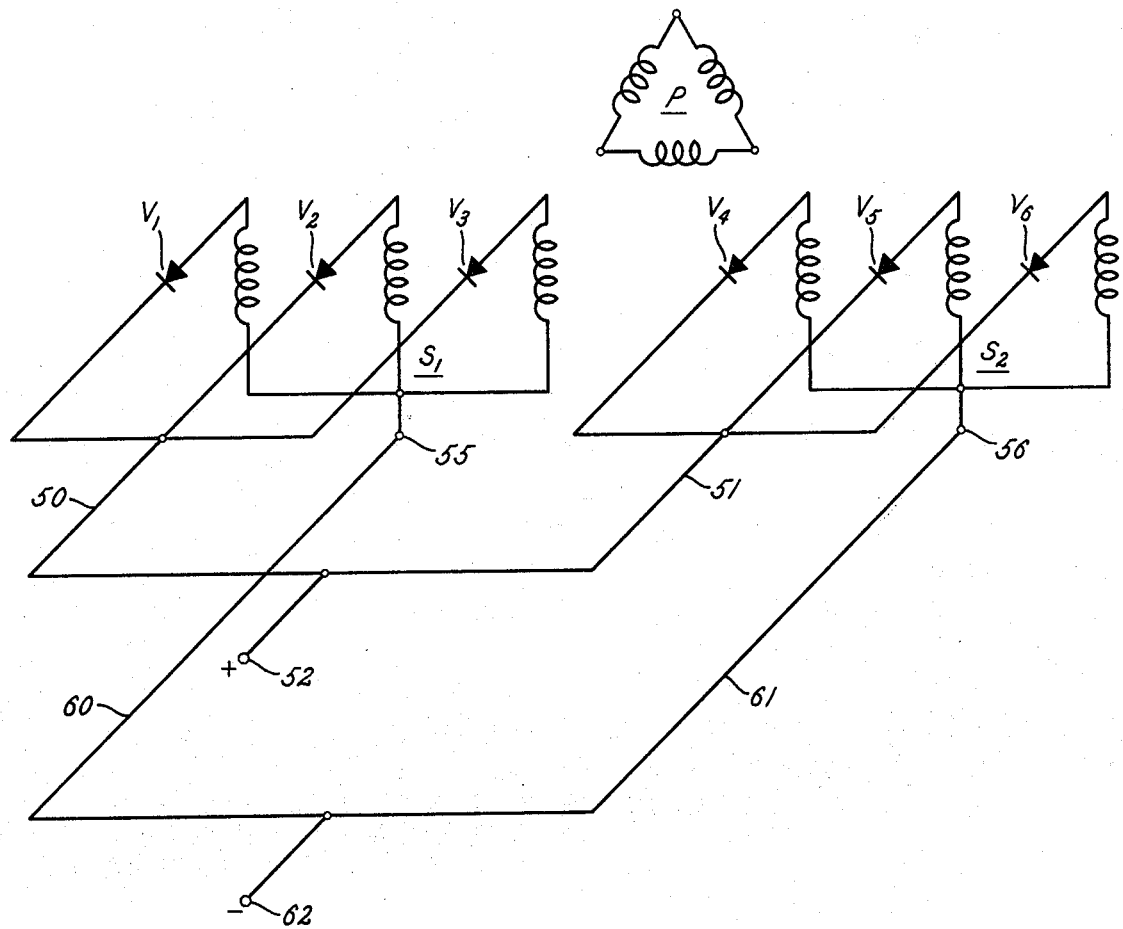
FIG. 8 is a schematic perspective circuit diagram of a double-wye-connected rectifier-transformer having a reactive DC bus embodying one aspect of my invention.

For example at FIG. 8 I have illustrated schematically inherently inductive interphase bus connections for a double wye-connected rectifier transformer having three phase primary windings P and two sets of wye-connected three phase secondary windings $S_1$ and $S_2$. The phase terminals of the six transformer secondary windings are connected through rectifying valves $V_1 - V_6$ and inductive sectional DC conductors 50, 51 to a positive main DC terminal 52. The neutral points 55 and 56 of the wye-connected secondary windings $S_1$, $S_2$ respectively, are connected through inductive sectional DC line conductors 60, 61 to a negative main DC terminal 62. It will be evident to those skilled in the art that between each parallel pair of DC line conductors 50, 60 and 51, 61 a coaxial tubular bus and valve mounting assembly similar to that shown in FIG. 4, 5 and 6 may be utilized if desired. In such a three phase coaxial assembly an additional tubular phase conductor would be added and three transverse base plates would be provided, each to carry the diodes associated with one of the six valves, $V_1 - V_6$, as in threes $V_1$, $V_2$, $V_3$, $V_4$, $V_5$, $V_6$.

Figure 7:
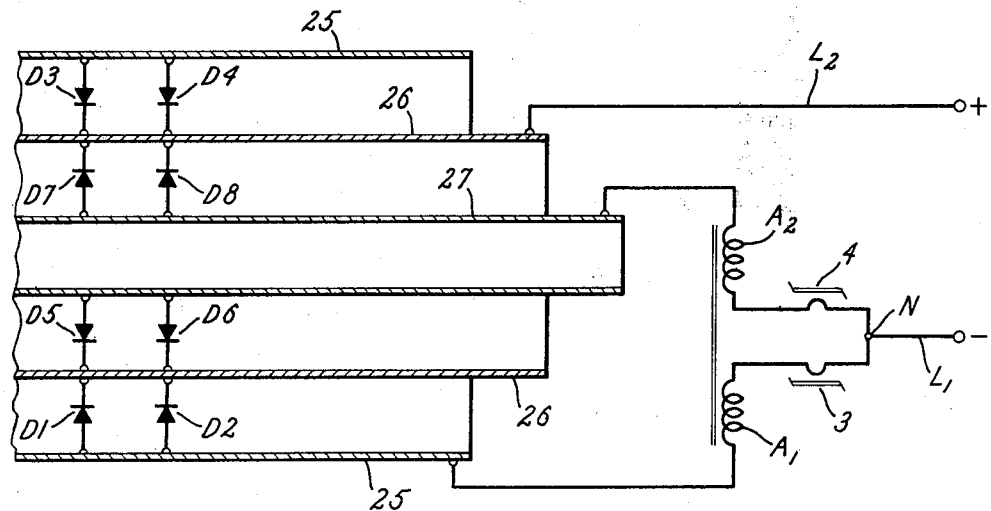
FIG. 7 is a diagrammatic illustration of another embodiment of my coaxial bus assembly.

It will be further understood by those skilled in the art that various modifications may be made in the concentric bus and valve structure indicated generally at FIG. 2 as the tubular coaxial bus assembly 15 and the circumferential valve assembly 12. For example, while I have illustrated circumferential arrays of diode valves mounted upon axially spaced transverse base plates 32, 33, balancing of the valve currents would be equally effective if the valves are located in the annular spaces between the tubular conductors and remotely from the transformer ends thereof as shown schematically at FIG. 7. At FIG. 7 the parts have been assigned reference numerals corresponding to those used at FIG. 3 and it will of course be understood that the plurality of diodes interposed radially between the concentric conductors of FIG. 7 extend in circumferential arrays around the tubular axis.

While I prefer to utilize my novel inductive DC bus structure in combination with a coaxial bus assembly and circumferential valve array as shown, it will be understood that such a valve and coaxial bus assembly may be utilized with other forms of DC line reactors and that my inductive DC bus assembly may be used with other forms of rectifying valves.

Thus while I have described certain preferred embodiments of my invention by way of illustration, many modifications will occur to those skilled in the art, and I therefore wish to have it understood that I intend in the appended claims to cover all such modifications as fall within the true spirit and scope of my invention.

What I claim as new and desire to secure by Letters Patent of the United States is:

1. In electric current converter apparatus, a power transformer including an enclosure and having a pair of alternating current phase winding terminals and an intermediate neutral terminal mounted upon said enclosure, a coaxial assembly of at least three tubular electrical conductors having one axial end adjacent said transformer terminals and the other end remote, means electrically connecting said phase winding terminals to a first and a second of said tubular conductors, respectively, at the transformer end of said coaxial assembly, a direct current terminal connected to a third said tubular conductor at said transformer end of said coaxial assembly, a plurality of semiconductor devices each having anode and cathode electrodes, means mounting said semiconductor devices in two angularly balanced valve arrays circumferentially about the axis of said coaxial assembly at the remote end thereof, common valve terminal means connecting like electrodes of all said semiconductor devices directly to said third tubular conductor at its remote end, and means connecting the other electrodes of each said valve array, respectively, directly to the remote ends of said first and second tubular conductors, whereby phase winding currents through said coaxial assembly are divided substantially equally among the semiconductor devices of each said valve array and unidirectional current from said valves traverses said assembly in directly reentrant relation, both said direct current and neutral terminals being adjacent the transformer end of said coaxial assembly.

2. Apparatus according to claim 1 wherein the mounting means for said valve arrays comprises an electrically conductive base member connected to said third tubular conductor and having two planar surfaces substantially perpendicular to said axis, the semiconductor devices of each said valve array being mounted upon said surfaces respectively, each in angularly balanced circumferential disposition about said axis.

3. Apparatus according to claim 2 wherein said conductive base member comprises a valve mounting enclosure having spaced apart side walls providing said planar surfaces and having fluid inlet and outlet ports, and means for supplying cooling fluid under pressure to the interior of said mounting enclosure.

4. Apparatus according to claim 3 wherein a plurality of pairs of spaced apart heat conductive mounting fingers are fixed upon the opposite outer side walls of said valve mounting enclosure in angularly balanced circumferential array with the radially outer finger of each pair electrically connected to said mounting enclosure, a semiconductor device interposed between and electrically connected to each said pair of fingers, end flanges on each of said first and second tubular conductors positioned externally adjacent said side walls respectively, and means connecting the radially inner fingers of each said pair of fingers to the associated end flange.

5. Apparatus according to claim 4 wherein said first and second tubular conductors are the inner and outer conductors of said coaxial assembly and said third tubular conductor is the intermediate conductor of said assembly, said intermediate tubular conductor being connected to said mounting enclosure and the innermost said tubular conductor passing axially through said mounting enclosure without electrical contact.

6. In combination with the apparatus of claim 1, a direct current line conductor disposed in parallel spaced relation with the axis of said coaxial assembly, and means connecting said direct current terminal to the proximate end of said direct current line conductor.

7. In combination with apparatus according to claim 1, a pair of direct current line conductors in parallel spaced apart relation, each said line conductor being in parallel spaced relation with the axis of said coaxial assembly, and means connecting the proximate ends of said direct current line conductors to said direct current line terminal and to said neutral terminal, respectively.

8. Apparatus according to claim 7 wherein said direct current line conductors are disposed in substantially coplanar relation with said axis and on substantially diametrically opposite sides thereof.

9. In electric current converter apparatus, a power transformer including an enclosure and having a pair of alternating current phase winding terminals and an intermediate neutral terminal mounted upon a wall of said enclosure, a pair of semiconductor valves each comprising a circumferential array of semiconductor devices disposed about an axis substantially perpendicular to said wall, a reentrant coaxial assembly of tubular conductors axially and concentrically disposed between said valves and said wall and providing a direct current terminal at the axial end thereof adjacent said wall, a pair of direct current line conductors extending parallel to said axis in parallel spaced relation therewith and on opposite sides thereof, means connecting the proximate ends of said direct current line conductors to said direct current line terminal and said neutral terminal, respectively, and means connecting each said phase winding terminals to the proximate end of one of said tubular conductors.

10. In electric current converter apparatus, a power transformer including an enclosure having a plurality of phase winding terminals and a neutral terminal mounted upon a wall of said enclosure, a plurality of semiconductor valves each having anode and cathode electrodes, conductor means connecting like electrodes of said valves to said phase winding terminals respectively, a direct current terminal disposed in proximity to said enclosure wall, conductor means connecting the other electrodes of all said valves to said direct current terminal, a pair of direct current bus conductors extending in substantially parallel spaced apart relation substantially perpendicular to said enclosure wall, and means connecting adjacent ends of said bus conductors to said direct current and neutral terminals, respectively.

11. Electric current converter apparatus according to claim 10 wherein said conductor means comprises a coaxial array of tubular conductors disposed in parallel spaced relation between said direct current bus conductors and extending axially between said enclosure wall and said valves.

* * * * *